(12) United States Patent
Baker, IV

(10) Patent No.: US 7,933,387 B1
(45) Date of Patent: *Apr. 26, 2011

(54) VOICE TRANSITION SCRIPT CALLER

(76) Inventor: Forest S. Baker, IV, Murray, UT (US)

( * ) Notice: Subject to any disclaimer, the term of this patent is extended or adjusted under 35 U.S.C. 154(b) by 1137 days.

This patent is subject to a terminal disclaimer.

(21) Appl. No.: 09/920,072

(22) Filed: Aug. 1, 2001

Related U.S. Application Data

(60) Provisional application No. 60/225,623, filed on Aug. 15, 2000.

(51) Int. Cl.
*H04M 1/64* (2006.01)

(52) U.S. Cl. ............ 379/67.1; 379/76; 379/265.01; 379/265.07; 379/265.11

(58) Field of Classification Search ........... 379/88.16, 379/88.17, 88.18, 265.01–266.1, 67, 1, 67.1, 379/88.19, 88.23, 48, 72, 76, 167.08, 263; 382/229; 709/213; 715/751
See application file for complete search history.

(56) References Cited

U.S. PATENT DOCUMENTS

| | | | |
|---|---|---|---|
| 4,567,359 A | | 1/1986 | Lockwood ............ 235/381 |
| 4,697,282 A | * | 9/1987 | Winter et al. ............ 379/88.23 |
| 5,146,562 A | * | 9/1992 | Kukla ............ 715/751 |
| 5,251,251 A | * | 10/1993 | Barber et al. ............ 379/88.23 |
| 5,430,792 A | | 7/1995 | Jesurum et al. ............ 379/67 |
| 5,511,112 A | * | 4/1996 | Szlam ............ 379/266.06 |
| 5,544,230 A | * | 8/1996 | Megyesi ............ 379/67.1 |
| 5,652,789 A | * | 7/1997 | Miner et al. ............ 379/201.01 |
| 5,724,420 A | | 3/1998 | Torgrim ............ 379/372 |
| 5,729,593 A | | 3/1998 | Baker et al. ............ 379/67 |
| 5,787,151 A | * | 7/1998 | Nakatsu et al. ............ 379/88.23 |
| 5,819,029 A | | 10/1998 | Edwards et al. ............ 395/186 |
| 5,828,731 A | | 10/1998 | Szlam et al. ............ 379/88 |
| 5,913,195 A | * | 6/1999 | Weeren et al. ............ 704/270 |
| 5,940,497 A | | 8/1999 | Miloslavsky ............ 379/265 |
| 5,946,386 A | * | 8/1999 | Rogers et al. ............ 379/265.09 |
| 6,009,149 A | | 12/1999 | Langsenkamp ............ 379/69 |
| 6,038,544 A | | 3/2000 | Machin et al. ............ 705/11 |
| 6,041,116 A | | 3/2000 | Meyers ............ 379/244 |
| 6,047,060 A | | 4/2000 | Fedorov et al. ............ 379/265 |
| 6,055,513 A | * | 4/2000 | Katz et al. ............ 705/26 |
| 6,216,111 B1 | * | 4/2001 | Walker et al. ............ 705/14 |
| 6,356,634 B1 | * | 3/2002 | Noble, Jr. ............ 379/266.07 |
| 6,459,774 B1 | * | 10/2002 | Ball et al. ............ 379/67.1 |
| 6,587,557 B1 | | 7/2003 | Smith ............ 379/265.01 |
| 2003/0202649 A1 | | 10/2003 | Haug, Jr. et al. ............ 379/265.01 |

* cited by examiner

*Primary Examiner* — MD S Elahee
(74) *Attorney, Agent, or Firm* — David Fonda

(57) ABSTRACT

A system allows an agent to execute an interaction protocol, to create an interaction between the agent and a contact. The agent or a computer dialing system initiates a call to a contact and the agent selectively interleaves responses to the contact with a live voice or with a recorded script. The interleaving of responses to the contact from the human agent and the recorded script approximates seamless transitions. The system includes a script player for outputting scripted voice waveforms over a phone line to a contact and a signal processor configured to provide a normalized signal selected from the output device and the script player.

48 Claims, 7 Drawing Sheets

VOICE TRANSITION SCRIPT CALLER

RELATED APPLICATIONS

This application claims the benefit of earlier filed U.S. provisional patent application Ser. No. 60/225,623, filed Aug. 15, 2000, and titled "Voice Transition Script Caller," which is incorporated herein by reference.

BACKGROUND OF THE INVENTION

1. Field of the Invention

The present invention relates generally to the management of a phone calling system for contacting customers or other contacts. More particularly, the present invention relates to a calling system which can seamlessly switch between and manage live voice and pre-recorded scripts.

2. Technical Background

In the sales business, telephone marketing is essential. Simply put, the more potential customers you contact, the more potential sales you will have. In the telemarketing business, many people are employed to contact potential customers. These employees typically have a script to read from so that the sales pitch is uniform and important information is not left out. Although market research may determine the best information to present to a particular type of customer contact, different agents present the material in different ways, and the way in which the agent communicates with a potential customer or contact is often the difference between a sale or a rejection. To that end, professional voice actors may be employed to deliver scripted information and content to contacts and potential customers. Ultimately, the voice actor records scripts to be played by multiple sales agents.

The problem with many existing calling systems however, is that they are inflexible in responding to a customer. A prerecorded script cannot respond with pertinent information to a presently-asked question. Perhaps most importantly, potential customers are often turned off by the fact that they are not talking to a live person, but rather a recording. A dialog between the calling system and the live contact may be disjointed because a computer controls the navigation and playing of the scripts and a particular prerecorded response selected by the computer may not precisely match the response by the contact. Another problem with many calling systems is that a human agent cannot interject into the dialog to respond to a concern by the contact, either by live-voice, or by a prerecorded interjection that is not part of a preplanned sales dialog.

Further, most existing calling systems do not keep track of data presented by the system and received by the contact. Nor can these systems verify information provided by the contact.

Presently known calling systems that play prerecorded scripts, either do not allow for interjection by a human voice, or do not allow the transparent switch from computer to human voice without a difference in sound or quality that is obvious to the contact. Further, existing telephone calling systems do not allow the seamless transition in content between a live voice and a prerecorded script.

Thus, it would be an advancement in the art to provide a calling system and method for contacting a customer that is flexible in the way content is presented to a customer. It would be an additional advancement in the art to provide such a system and method that could be used with outgoing calls. It would be another advancement if a variety of prerecorded content could be provided and easily negotiated by a sales agent. It would be an additional advancement in the art to provide a system and method that could keep track of important calling and contact data. It would be yet an additional advancement in the art to provide a system and method for seamlessly and transparently integrating an agent's live voice with a prerecorded voice by someone other than the agent. It would be another advancement to provide a system and method that was easy to utilize and navigate between scripts to form a dialog that was not disjointed.

Such a system and method in accordance with the present invention is disclosed and claimed herein.

SUMMARY OF THE INVENTION

The present invention solves many or all of the foregoing problems by introducing a system and method by which a an agent can initiate an outgoing call and seamlessly and selectively transition between prerecorded scripts and/or the agents live voice.

In one embodiment, the calling system includes an output device for providing audio outputs from an agent. The system also includes an input device for receiving audio inputs from a contact. A player for outputting scripted voice waveforms over a phone line to a contact is also included. A signal processor is configured to provide a normalized signal selected from the output device and the player.

The signal processor may match the signal-to-noise ratio of the input coming into the signal processor and the output going out. In one preferred embodiment, the player provides an input to the signal processor which provides an output having a signal-to-noise ratio substantially the same as the signal-to-noise ratio of the output device. Accordingly, the signal processor can normalize a first voice waveform received from the output device and a second voice waveform received from the player so that they sound the same to the contact. This can be accomplished because the telephone system has a limited band width that carries the voice. Additionally, the sound card adjusts the microphone volume of the telemarketing agent to match the volume of the pre-recorded script. Because both the voice of the telemarketing agent and the sound of the pre-recorded script pass through the same amplifier system, and then through the limited band of the telephone line, the sound quality of the telemarketing agent and the pre-recorded script are the same. The hardware acts as a filtering element for both sources of sound.

The system also includes a computer having a processor and a memory device. The memory device stores a script module which is executable on the processor. The system is configured to provide an output having a bandwidth greater than the response bandwidth of a telephone network. Thus, the system acts as a filter to make it difficult for the contact to tell the difference between the prerecorded scripts played by the system and the human agent's voice spoken through the system.

In one aspect of the invention, a calling system includes a script module configured to provide recorded voice waveforms and an integration module configured to interface between an agent and the script module. The script module may include a script player for playing the recorded voice waveforms. In one preferred embodiment, the recorded waveforms are selected from computer generated wave files, audio recordings, synthesized voice, and actual voices. The system allows the recorded waveforms to be selectively provided by a human agent.

The integration module may include a telephone interface module to facilitate interaction with the system and a telephone system. In one embodiment, the telephone interface module allows a human agent to initiate a call to a contact. In one embodiment, a human agent or a computer dialer may initiate a call to a contact. The computer program allows the telemarketing agent to login and select a type of voice for the pre-recorded script. For example, the telemarketer may be a female with a low voice and she would select the script that has been pre-recorded in a low speaking female's voice.

The integration module allows the execution of an interaction protocol by a human agent for interacting with a contact. The interaction protocol allows the agent to select and present content to a contact in the selected voice type and pose a question or statement to a contact in response to a contact's response or statement. The integration module may include a mode module to allow a sales agent to select between one of live voice interaction, script interaction, and interjection interaction between the agent and a contact. The hardware and software make it difficult for an untrained ear to tell the difference between the pre-recorded script and the live voice of the telemarketer.

The program may present to the telemarketing agent a number of options on the monitor. On one side of the monitor are shown scripted responses that are standard in general conversations such as an affirmative response, a negative response, or a laugh. On the other side of the screen are anticipated responses that the potential customer may make in answer to the live telemarketing agent's initial questions.

For example, the live telemarketer's initial question is usually a yes or no question and, depending upon the potential customer's response, she would type in a letter corresponding to the customer's response; in this case "yes" or "no." This selection by the telemarketer would play a pre-recorded message ending in a question, to which the potential customer could give a limited number of responses. Those anticipated responses are shown on the screen and depending upon the response given by the potential customer, the telemarketer would click on that response. The next pre-recorded script would play ending in questions capable of being answered in a finite number of ways which would be shown on the screen. In this way, the potential customer's answers to questions are anticipated and responses to those answers are pre-recorded. The telemarketing agent simply clicks on the answer given by the potential customer and in that way can control the branching of a dialog between the potential customer and the recorded script. At any time during the process, the telemarketing agent can pause the program and talk live with the customer. This might happen when the customer gives a response that was not anticipated and for which there is no counter response that has been pre-recorded. The program also allows the telemarketing agent to move back up the dialog branch and click on different pre-recorded responses that would answer the potential customer's questions or statements.

Accordingly, this invention allows the telemarketing agent to flexibly control the direction of the dialogue with a potential customer using branching techniques and script positioning to play pre-recorded responses to any one of many potential questions or statements by the potential customer. In this way, the potential customer has the illusion of talking to a responsive, live telemarketing agent.

In one embodiment, the includes a database module for storing and retrieving data. The database module may be able to update a contact file and keep a record of which scripts were played during an interaction between the agent and a contact.

The method for contacting a customer may include the steps of providing an integrated system for interaction with a contact, the interaction being selectable between human and computer delivery. An interaction protocol may then be executed to create an interaction with the contact. A call may be placed to a contact and responses to a contact from a human agent and a recorded script can be selectively interwoven into the call.

The step of interweaving responses in the agent's live script and in pre-recorded script further includes listening by the human agent to a response from the contact. The agent may then select and present content to the contact. The agent may then pose a question to the contact and repeat the process of listening to the contact and selecting and presenting more content. At any time, the agent may decide to intervene into the dialog and present content via live voice or prerecorded script. The method of customer contacting may also include validating sales information and keeping a history of recorded scripts played.

Accordingly, the present invention provides a client-initiated program and method of using same for providing outgoing calls. The invention may provide human voice or pre-recorded scripts that are flexible in the way content is presented and easily negotiated. The present invention also provides a program that allows for live validation of sale information (i.e. credit card information, etc.) and allows the operator to maintain and update a customer profile. The system and method of the present invention also allows the program to keep an historical record of which pre-recorded tracks were played by the sales agent and in what order. Thus, promises or statements which the customer alleges were made by the sales agent can be verified or denied with a tangible record. The system of the present invention provides for the seamless and transparent integration of an agent's live voice with a prerecorded voice by someone other than the agent.

These and other features and advantages of the present invention will become more fully apparent from the following description and appended claims, or may be learned by the practice of the invention as set forth hereinafter.

BRIEF DESCRIPTION OF THE DRAWINGS

To better understand the invention, a more particular description of the invention will be rendered by reference to the appended drawings. These drawings only provide information concerning typical embodiments of the invention and are not to be considered limiting of its scope. The invention will be described and explained with additional specificity and detail through the use of the accompanying drawings, in which.

Figure 1:
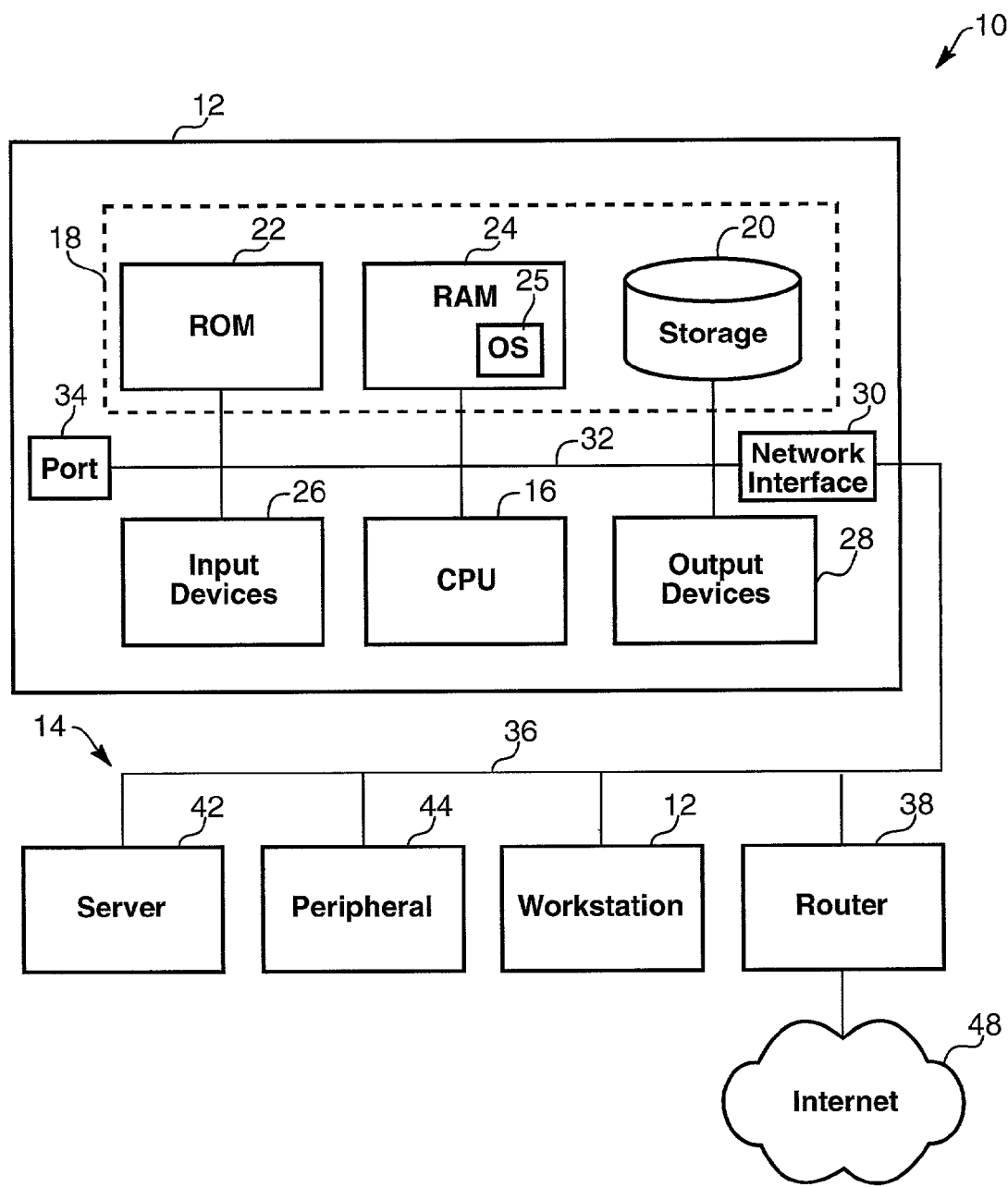
FIG. 1 is a schematic block diagram of a computer system suitable for implementing one embodiment of the invention.

The figures depict embodiments of the present invention for purposes of illustration only. Those skilled in the art will readily recognize from the following discussion that alternative embodiments of the illustrated structures and methods may be employed without departing from the principles of the invention described herein.

DETAILED DESCRIPTION OF THE PREFERRED EMBODIMENTS

Certain preferred embodiments of a system in accordance with the invention are now described with reference to the FIGS. 1-7, where like reference numbers indicate identical or functionally similar elements. The components of the present invention, as generally described and illustrated in the Figures, may be implemented in a wide variety of configurations. Thus, the following more detailed description of the embodiments of the system and method of the present invention, as represented in the FIGS. 1-7, is not intended to limit the scope of the invention, as claimed, but is merely representative of presently preferred embodiments of the invention.

Various components of the invention are described herein as "modules." In various embodiments, the modules may be implemented as software, hardware, firmware, or any combination thereof. For example, as used herein, a module may include any type of computer instruction or computer executable code located within a memory device and/or transmitted as electronic signals over a system bus or network. An identified module may, for instance, comprise one or more physical or logical blocks of computer instructions, which may be organized as an object, procedure, function, or the like.

Nevertheless, the identified modules need not be located together, but may comprise disparate instructions stored in different locations, which together implement the described functionality of the module. Indeed, a module may comprise a single instruction, or many instructions, and may even be distributed over several different code segments, among different programs, and across several memory devices.

As used herein, the term executable code, or merely "executable," is intended to include any type of computer instruction and computer executable code that may be located within a memory device and/or transmitted as electronic signals over a system bus or network. An identified module of executable code may, for instance, comprise one or more physical or logical blocks of computer instructions which may, for instance, be organized as an object, procedure, or function. Nevertheless, the executables of an identified module need not be located together, but may comprise disparate instructions stored in different locations which together comprise the module and achieve the purpose stated for the module. Indeed, an executable may be a single instruction, or many instructions, and may even be distributed over several different code segments, among different programs, and across several memory devices.

Similarly, operational data may be identified and illustrated herein within modules, and may be embodied in any suitable form and organized within any suitable type of data structure to be used, produced, or operated on during execution of an executable. The operational data may be collected as a single data set, or may be distributed over different locations including over different storage devices, and may at least partially exist merely as electronic signals on a system bus or network.

FIG. 1 is a schematic block diagram illustrating a computer system 10 in which a plurality of modules may be hosted on one or more computer workstations 12 connected via a network 14. The network 14 may comprise a wide area network (WAN) or local area network (LAN) and may also comprise an interconnected system of networks, one particular example of which is the Internet.

A typical computer workstation 12 may include a central processing unit (CPU) 16. The CPU 16 may be operably connected to one or more memory devices 18. The memory devices 18 are depicted as including a non-volatile storage device 20 (such as a hard disk drive or CD-ROM drive), a read-only memory (ROM) 22, and a random access memory (RAM) 24.

Preferably, the computer workstation 12 operates under the control of an operating system (OS) 25, such as OS/2®, WINDOWS NT®, WINDOWS®, UNIX®, and the like. In one embodiment, the OS 25 may provide a graphical user interface (GUI) to enable the user to visually interact with the modules of the present invention. The OS 25 may be loaded from the non-volatile storage device 20 into the RAM 24 at the time the workstation 12 is booted.

The workstation 12 may also include one or more input devices 26, such as a mouse 50 and/or a keyboard 52 (FIG. 2), for receiving inputs from a user. Similarly, one or more output devices 28, such as a monitor and/or a printer, may be provided within, or be accessible from, the workstation 12.

A network interface 30, such as an Ethernet adapter, may be provided for coupling the workstation 12 to the network 14. In one embodiment, the workstations 12 may be coupled to the network 14 via a distributed remote data architecture (DRDA). Where the network 14 is remote from the workstation 12, the network interface 30 may comprise a modem, and may connect to the network 14 through a local access line, such as a telephone line.

Within any given workstation 12, a system bus 32 may operably interconnect the CPU 16, the memory devices 18, the input devices 26, the output devices 28, the network interface 30, and one or more additional ports 34, such as parallel and serial ports.

The system bus 32 and a network backbone 36 may be regarded as data carriers. Accordingly, the system bus 32 and the network backbone 36 may be embodied in numerous configurations, such as wire and/or fiber optic lines, as well as electromagnetic channels using visible light, infrared, and radio frequencies.

In general, the network 14 may comprise a single local area network (LAN), a wide area network (WAN), several adjoining networks, an Intranet, or, as in the manner depicted, a system of interconnected networks such as the Internet 40. The individual workstations 12 may communicate with each other over the backbone 36 and/or over the Internet 40 using various communication techniques.

For instance, different communication protocols, e.g., ISO/OSI, IPX, TCP/IP, may be used within the network 14. In the case of the Internet 40, however, a layered communications protocol (i.e. TCP/IP) generally best enables communications between the differing networks 14 and workstations 12.

The workstations 12 may be coupled via the network 14 to application servers 42, and/or other resources or peripherals 44, such as scanners, printers, digital cameras, fax machines, and the like. External networks, may be coupled to the network 14 through a router 38 and/or through the Internet 40.

Figure 2:
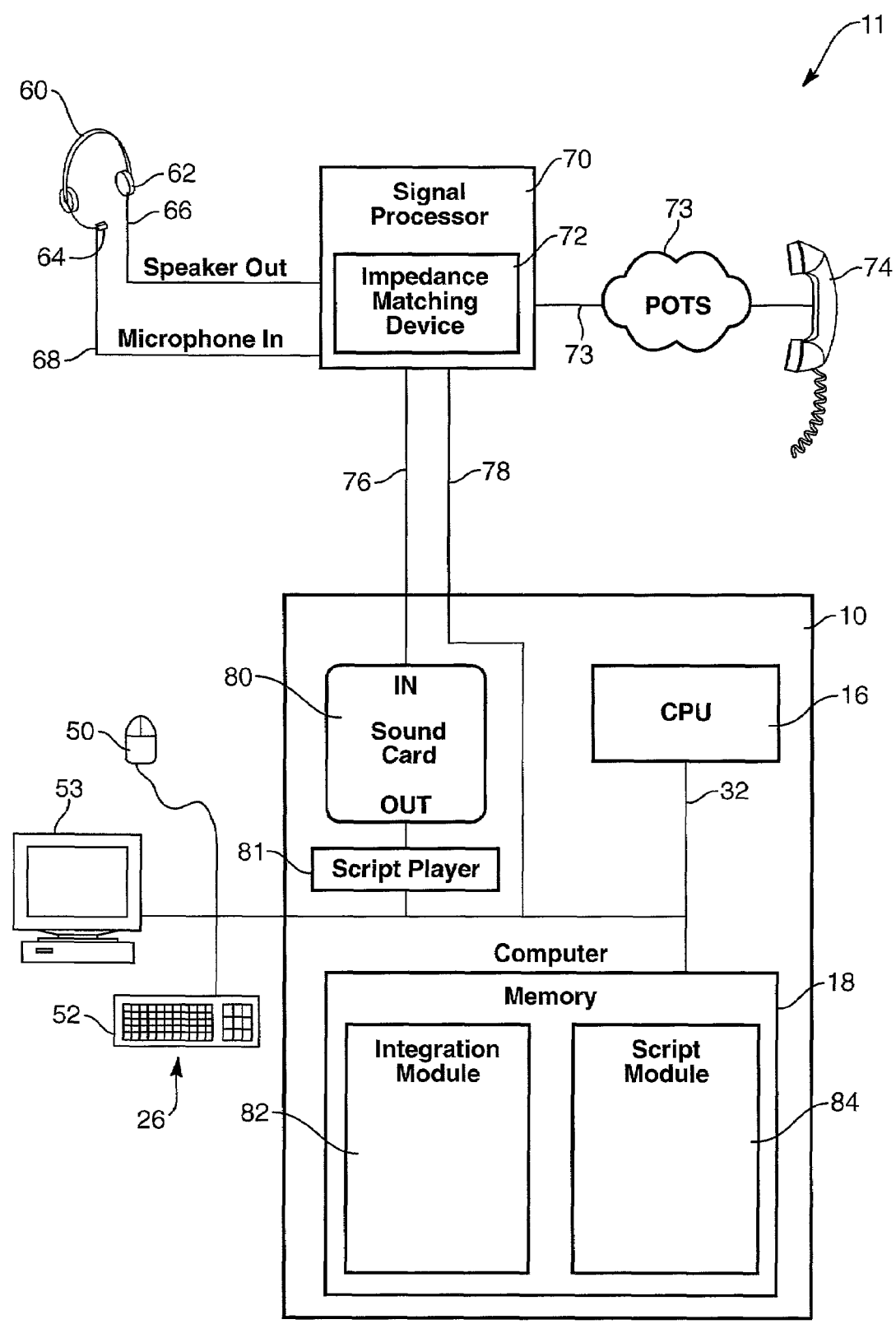
FIG. 2 is a schematic block diagram of the physical components of one embodiment of a calling system which incorporates the computer system of FIG. 1.

Referring now to FIG. 2, the computer system 10 is part of a calling system 11 for customer contacting. The term customer, as used herein throughout, may be any type of contact that may be the object of a phone call. A user or sales agent my wear a headset 60 which includes an earpiece 62 for receiving audio inputs from a contact. A microphone 64 may be provided fro providing audio outputs to the contact from the agent. A signal processor 70 is also connected to the microphone 64, which may also be connected to the headset 60, by means of a microphone in line 68.

The signal processor 70 may be connected to a sound card 80 by means of input lines 76 and output lines 78. It will be appreciated that the signal processor 70 may be part of the computer system 10. In this embodiment, the signal processor may interact via the busline 32. The sound card 80 is connected via the busline 32 to the CPU 16 and to output devices 28 including a script player 81. The sound card 80 is capable of outputting scripted voice waveforms over a telephone system 73 to the contact. It will be appreciated that the sound card 80 together with the processor 16 act as a player 81. In other embodiments, the player 80 may be a script player 81 which may be a stand alone module or device.

The sound card 80 or player 81 may be configured to provide an input to the signal processor 70 over a bus line 76, 78 effective to render an output therefrom to the contact having a signal-to-noise ratio substantially the same as the signal-to-noise ratio of the output device 64.

The signal processor 70 may include an impedance matching device 72 which may be connected to the phone system 73 and consequently to a potential customer's telephone 74. The impedance matching device 72 may be integral with the signal processor 70 or may be a stand-alone device. The signal processor 70, together with the impedance matching device 72, are configured to provide a normalized signal selected from one of the output device 68 and the sound card 80 or player 81. The signal processor 70 and the impedance matching device 72 are further configured to substantially match the signal-to-noise ratio of an output thereof, independent from the input thereto. Accordingly, the signal processor 70 and/or the impedance matching device 72 may normalize a first voice waveform received from the output device 64 and a second voice waveform received from the sound card 80 so that the source of these voice waveforms is substantially indistinguishable to the contact over the phone system 73.

Thus, the present invention allows the transparent interleaving of live voice and prerecorded script by the agent. The transparent interleaving is further accomplished because the bandwidth of the data leaving the signal processor 70 and impedance matching device 72 is greater than the bandwidth of the phone system 73, or an individual phone line that is part of the phone system 73. A normal phone line band width is between about 200 hz and 6,000 hz. The output from the system 10 in one embodiment of the present invention is delivered at a band width approaching 20,000 hz. By sending the recorded voice and the live voice through the same output, namely the signal processor 70 and impenence matching device 72, at a higher band width than the phone, a natural filtering occurs making the two sounds indistinguishable when the scripts are recorded at a high sampling rate. The customer being called can not tell the difference between the agent's voice and the pre-recorded script that an agent may decide to play.

The transparency between the output delivery of the live voice and prerecorded script to the contact is also accomplished because the prerecorded scripts are recorded at a high sampling rate. In one preferred embodiment, the sampling rate of recording is approximately 44,100. It will be appreciated by those of skill in the art that this is higher than typical phone recording sampling rates.

The signal processor 70 interacts with the computer's memory 18, which in a preferred embodiment, contains an integration module 82 and a script module 84, which are executable on the processor 16. As will be discussed in greater detail below, this hardware and software configuration allows a human agent or the program itself to execute an interaction protocol to create interaction with a contact or potential customer. The hardware and software of the this system 11 allows the sales agent or computer to initiate the call and selectively interleave responses from the agent and a recorded script.

Figure 3:
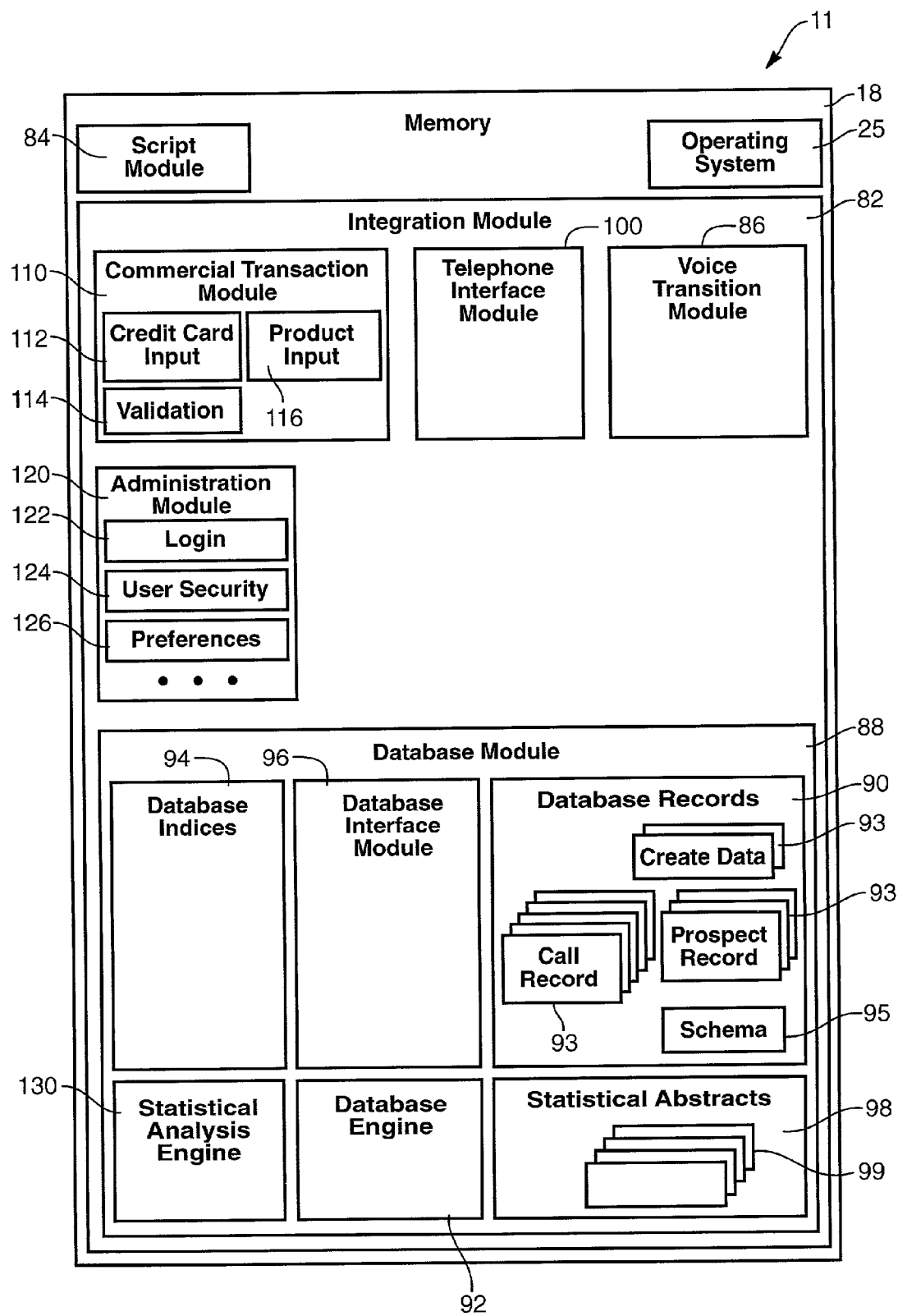
FIG. 3 is a schematic block diagram of the system of FIG. 2, showing an integration module for providing seamless live-voice and prescripted integrated and interactive customer contacting according to one embodiment of the present invention.

Referring now to FIG. 3, the integration module 82 includes a voice transition module 86 for allowing the user to transition between live voices, a script branching hierarchy, and various interjections. As will be discussed in greater detail below, the voice transition module 86 includes graphics and executable files for easy user navigation.

The integration module 82 may contain a database module 88 for storing and retrieving data. In one embodiment, the database module 88 includes database records 90, a database engine 92, and database indices 94. The database engine 92 may access data 93 and a schema 95 that are part of the database records 90. Examples of data may include call records 93 or prospect records 93. The integration module 82 also includes a database interface module 96 and statistical abstracts 98 for ease in interfacing with the database engine 92 and records 90. The database module 88 of the present invention may include database indices 94 that allow you to parse through database records 90 looking for specific information. The agent of user may selectively create or identify countless indices 94 to facilitate the convenient retrieval of data. It will be appreciated that the database engine 92 and records 90 may be stand alone standardized database products known in the industry such as those made by Cybase® or Oracle®.

A statistical analysis engine 99 may operate in the background to access the database engine 92 and provide analysis of the database records 90. The statistical analysis engine 99 along with the database engine 92 may be programmed, or accessed manually, to update and generate reports, or retrieve information on customer profiles, purchasing habits, purchaser demographics, product popularity, and other commercially valuable information. This information may be utilized to help the user or agent know which calls to make.

The database module 89 is also configured to maintain a history of any prerecorded scripts played by the system 11. It will be appreciated that this will help determine or confirm what was represented to the contact by the sales agent or user.

Accordingly, the database module 88 of the system 11 allows for the automatic or manual update of a contact or customer file. The database module 88 allows the user, either manually or automatically, to keep and update a customer profile. The database module 88 also provides data storage and retrieval capabilities that allow the history of scripts to be recorded and archived for possible future reference.

The integration module 82 may contain a telephone interface module 100 which allows the system 10 of the present invention to interface with the telephone system 73. The telephone interface module 100 allows a human agent or a computer dialer to initiate a call to a contact. In one embodiment, the telephone interface module 100 may go into the statistical abstracts 98, for example and request data 99 such as all of the contact information on people who buy from a particular store, or who have bought something within the last 90 days and have incomes over $50,000. The telephone interface module 100 may go through the the demographic data or customer profile data stored in the database module 88. The telephone interface module 100 may then take the statistical abstract 98 data and initiate the call for the agent. In another embodiment, the telephone interface module 100 may present the agent with a menu of various options from which to choose including phone numbers of various contacts. The agent may then initiate the call or have the telephone interface module 100 make the call.

The present invention also includes a commercial transaction module 110 which in one embodiment, contains a credit card input 112, a validation 114, and a product input 116. The commercial transaction module 110 allows the system 10 to validate contact sales information. The commercial transaction module 110 does all the credit card readings. The commercial transaction module may utilize the credit card input 112 and a validation 114 to determine whether the credit card has expired. The commercial transaction module 110 may also double check the information that an agent enters against stored information. The commercial transaction module 110 may also use the product input 116 to track and record product purchases. The product data may be sent to a manufacturer or distributor for shipment. It will be readily appreciated by those of skill in the art that credit data may be included as data 93 in the database records 90 including, user ID, credit card number, expiration date, and credit history verification.

The integration module 82 also includes an administration module 120 which may have a login 122, a user security 124, and preferences 126. The login 122 may query a user for identification information which may include a user name and password. The user security 124 may be configured to conduct security checks. Thus, the administration module 120 may require customer authorization before the agent can access the content of the system or any system displays. The user security 124 module may administer the access to sensitive information such as credit card numbers, social security numbers, personal telephone numbers, passwords, keys, and the like. In this manner, the contact has less anxiety in given up certain information during the call. The administration module 120 is further configured to store system preferences 126 such as logins, agent names, times, dates, passwords, and the like.

Figure 4:
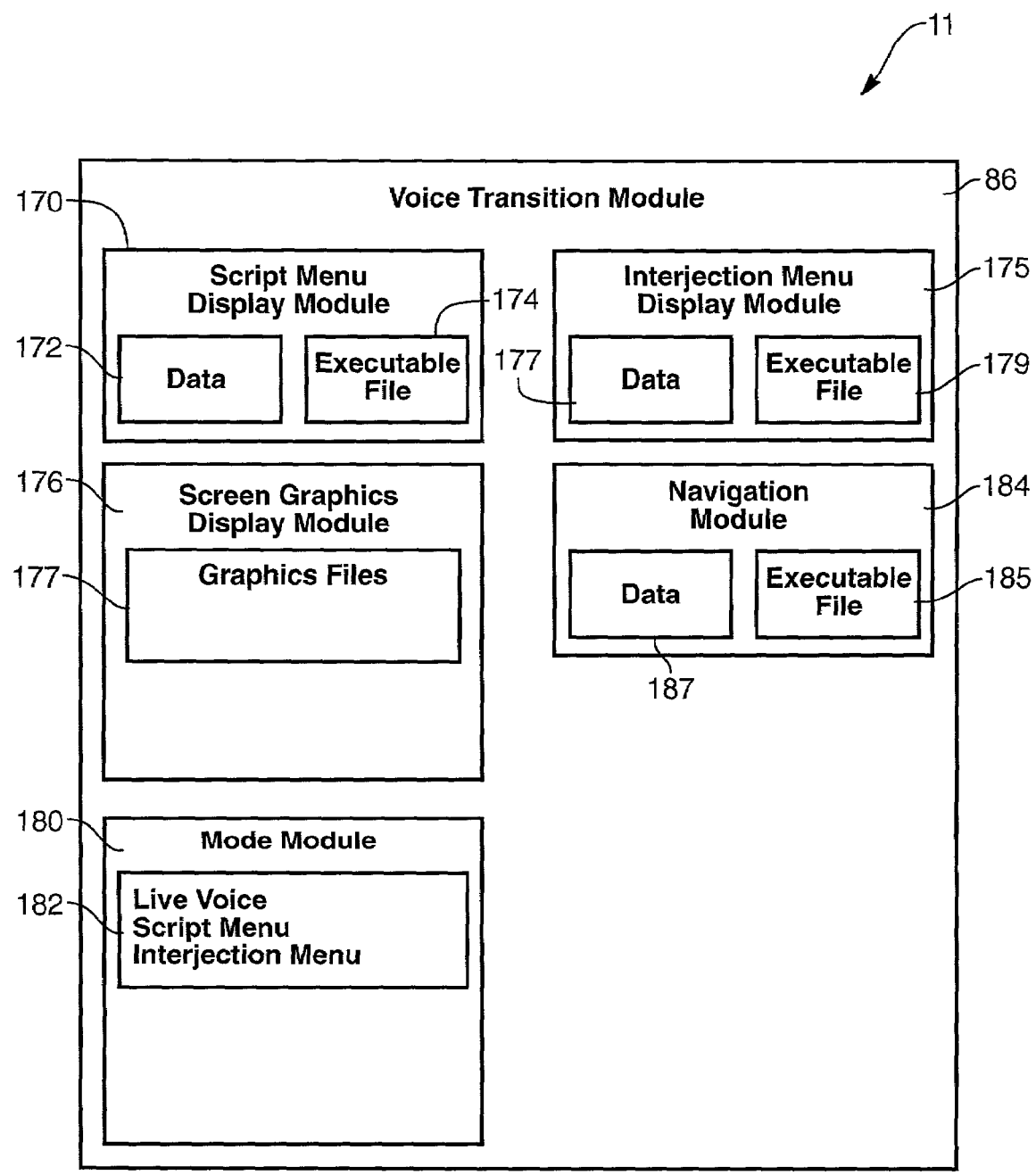
FIG. 4 is a schematic block diagram of a voice transition module of the system of FIG. 3 according to one embodiment of the present invention.

Referring now to FIGS. 3 and 4, the voice transition module 86 may cue up a script by means of a script menu display module 170. The script menu display module 170 may display script data 172 on the monitor 53. By clicking on the data 172, the users may launch an executable file 174 for the selected script. The voice transition module 86 also includes an interjection menu display module 175 like the script menu display module 170. The interjection menu display module 175 may display interjection script data 177 on the monitor 53 which when clicked or selected, launches an executable 179 for playing the interjection script. As discussed in greater detail below, the script menu display module 170 poses closed-ended questions, while the interjection display module selectively interjects statements by the human agent or user. The interjections may be selectively chosen from the human agent's or user's voice, and a recorded voice waveform. Accordingly the integration module 82 allows a user to select and present content to a contact.

The voice transition module 86 may also include a screen graphics display module 176. The screen graphics display module 176 may interact with graphics files 177, to facilitate the display of scripts or interjections on the screen for the user to select. The graphics display module 176 makes the program user friendly. The screen graphics display module 176, together with the graphics files 177, may produce images on the screen, prompts, reminders, borders, and a graphical presentations that can be navigated by the agent using a mouse 50.

The voice transition module 86 also includes a navigation module 184 for negotiating between scripted responses to a contact. The navigation module 184 is responsible for interacting between the monitor 53 and the mouse 50 and the agent. The navigation module 184 allows the script menu display module 170 to have executable files 185 associated with data 187 on the screen to allow the agent to point and click with the mouse 50 or use a keyboard 52 to navigate between screens.

The voice transition module 86 of the integration module 82 may include a mode module 180 with various mode sections 182. The mode module 180, allows the agent to select between different modes 182, including, live voice, script menu, or an interjection menu in order to interact with a contact. The mode module 180 switches hardware, so that the system is taking the data from different places in the program or voice input. As will be discussed in greater detail below, the selected script data 172 or interjection data 177 is played to the contact as recorded waveforms which may be preferably selected from computer generated wave files, audio recordings, synthesized voice, and actual voice.

In one embodiment, the microphone 64 may be on all the time with the volume turned down when the mode module 180 is in the script or interjection mode. In another embodiment, the microphone 64 is turned off during script or interjection mode and back on during live voice mode. In still another embodiment, one mode signal is simply overridden by another signal when the mode changes. The mode module 180 is what transitions the electronic switch around without sounding anything to the customer. Thus, in live voice, a user or the system does not have any clicks or pauses or transitional changes in pitch.

Figure 5:
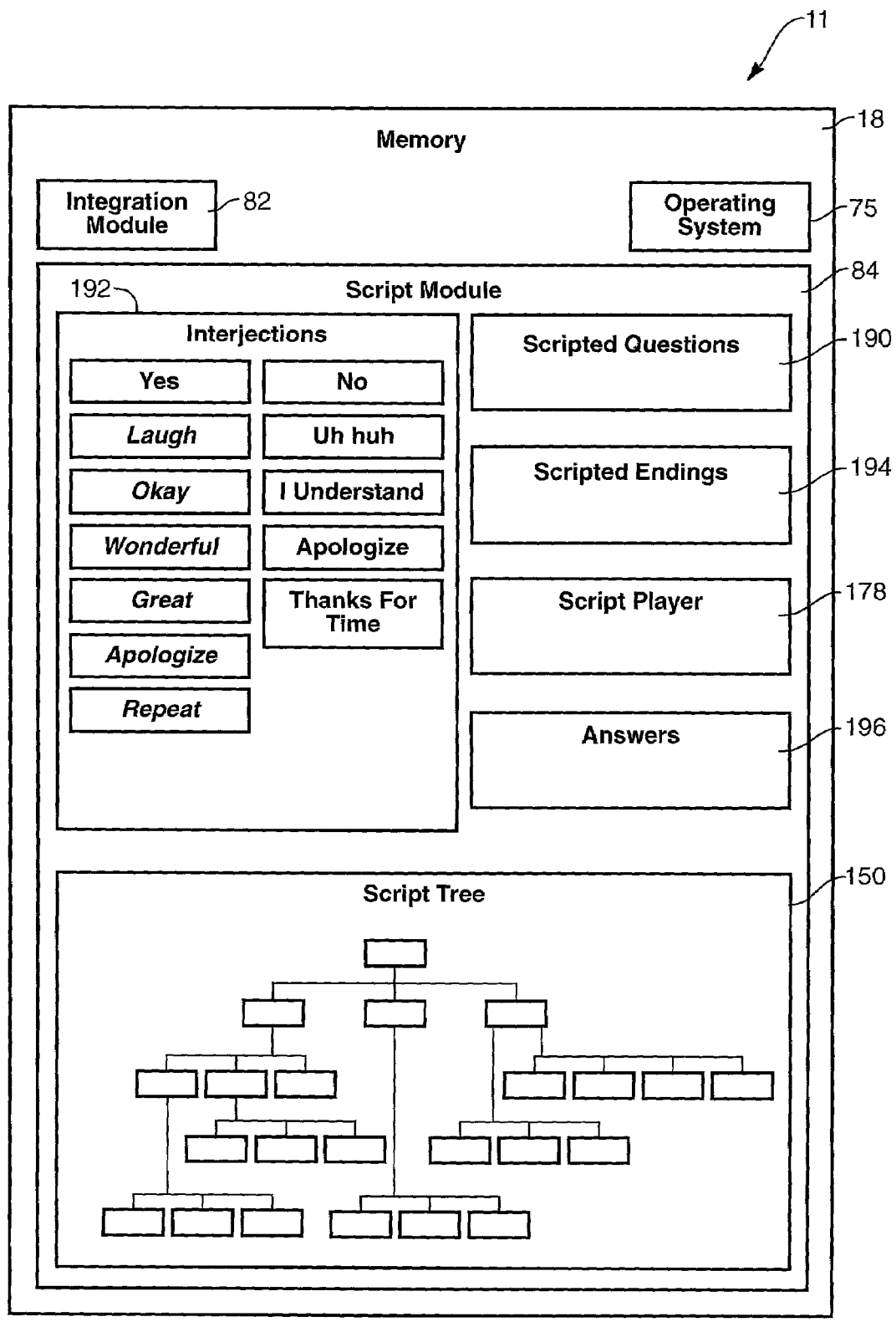
FIG. 5 is a schematic block diagram illustrating a script module of the embodiment of FIG. 2, showing a script module for providing and playing prerecorded script options according to one embodiment of the present invention.

Referring now to FIG. 5, when the agent determines to play scripted questions 190, the script module menu 84 turns on the script player 81. The script module 84 feeds the start of a scripted question 190 or an interjection 192 to the script player 81 for playing. The mode module 180 (FIG. 4) turns on the script player 81. When the system 10 receives an interrupt signal back from the script player 81, the system 10 may perform a live voice transition back to the microphone 64 unless there is another scripted questions 190 or interjection 192 selected. If so, the mode module 180 transfers control of the program to the script player 81 for playing of the next recorded data 190, 192. The scripted questions 190 are prerecorded as a series of questions with a finite number of possible answers. When the first question is asked, the agent may select one of the known possible answers by clicking on the graphically displayed answer. This launches the next scripted question 190 which also has a known number of answers, the selection of which by the agent will launch the playing of the next scripted question 190. The location of the various scripted questions 190 may be displayed in a script tree 150 which can be navigated by a mouse 50, keyboard 52, or other input device such as a touchpad, voice recognition software, and the like. At any time, the agent may interject with an interjection statement 192 such as "yes," "no," "uh huh," laughter, and the like. The user may also select a scripted ending statement 194 such as "thanks for purchasing our product," or a description of the product selected by the contact. Accordingly, the system 11 is configured to allow the agent or user to selectively provide prerecorded waveforms in the form of scripted dialog.

Figure 6:
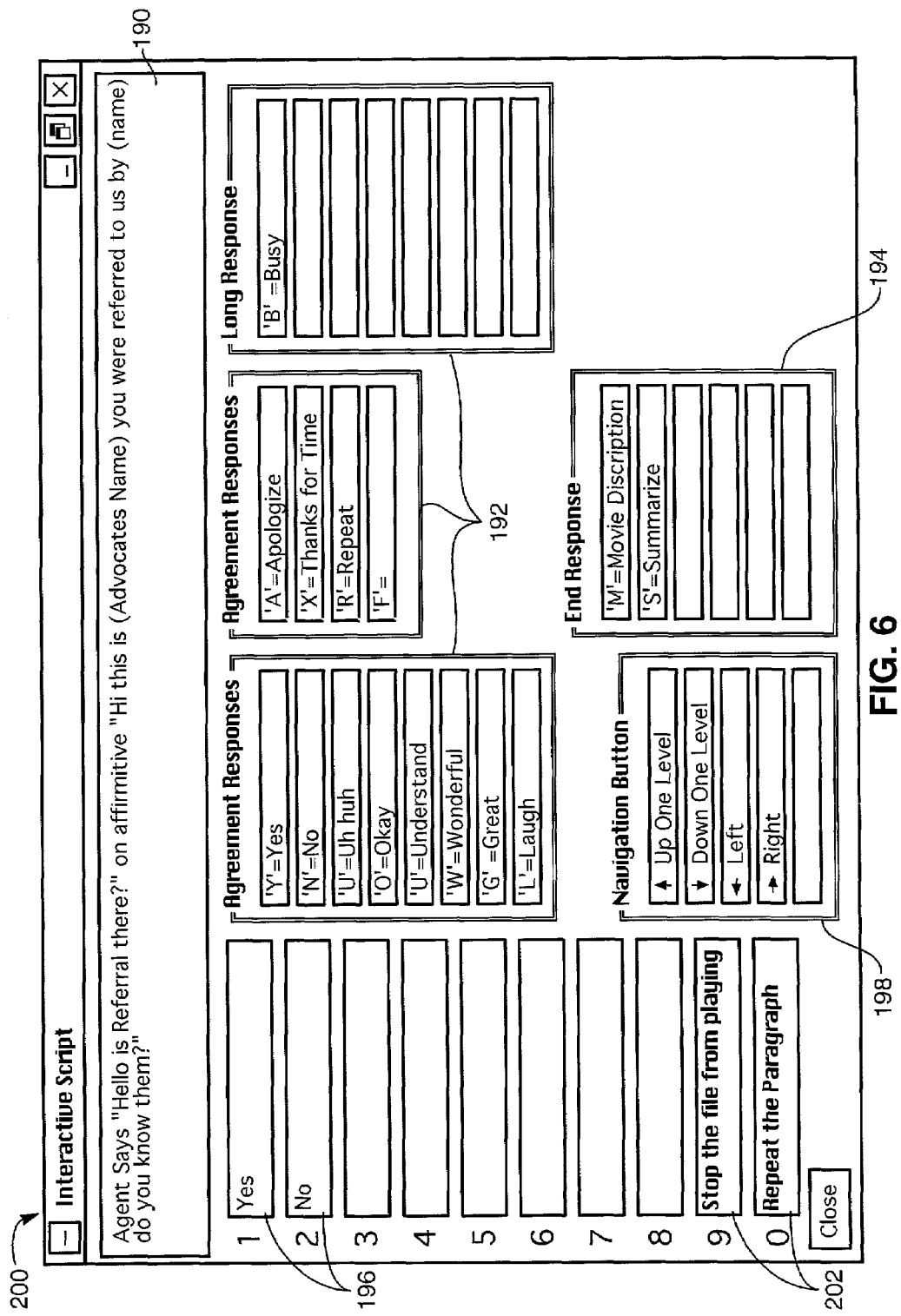
FIG. 6 is a user interface displaying various options for a user of the system and method of the present invention.

Referring now to FIG. 6, a user interface 200 displays various options for the user. A first or any subsequent scripted question 190 is displayed. In conjunction with the scripted question, a number of corresponding possible answers 196 are displayed. Interjection scripts 192 are displayed should the user wish to interject into the series of questions and answers statements. Control options 202 allow the user to switch from scripted statements to live voice and back again.

Navigational options 198 may also be displayed to move through hierarchical layers in a menu organization.

Figure 7:
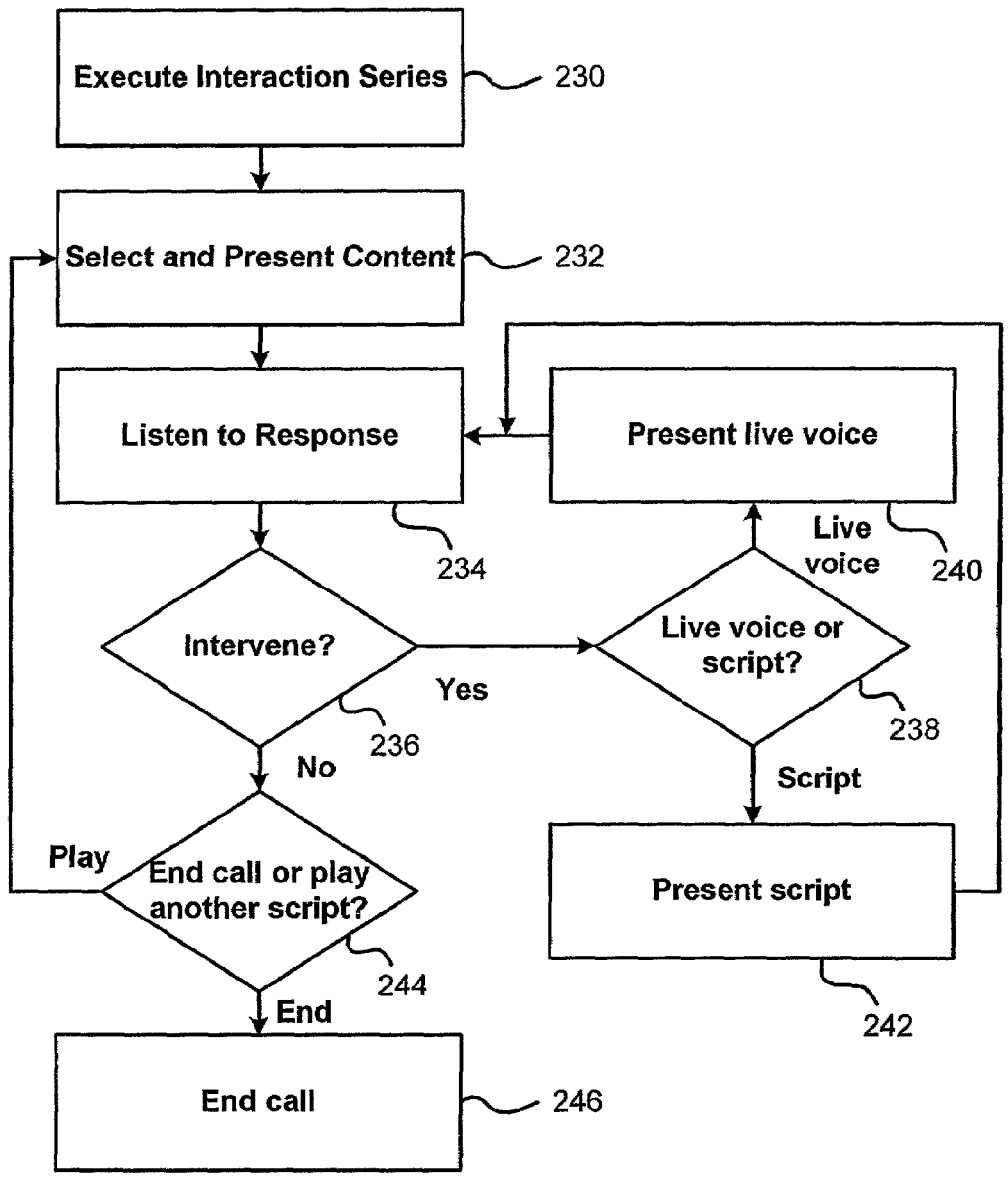
FIG. 7 is a flow diagram of a method of the present invention.

Referring now to FIG. 7, a flow diagram of a method of the present invention is shown. The user may execute an interaction series 230 for executing a call to a contact. The user may then select and present content 232 to the contact. The content 232, this may be in the form of a question having a finite number, or closed set, of answers. The user may then listen to a response 234 and decide whether to intervene 236 in the call. If the user does decide on intervention, he may decide 238 to create and deliver a personal live-voice response 240 or select and play one of number of scripted responses 242. The user then listens to the response 234 and again decides whether to intervene 236 in the call. If the user does not decide to intervene, the user may decide to select and play another scripted response 244, which starts the process over. The user may also decide to end the call 246 by live voice or by playing a standard ending script.

The method for customer contacting may start by providing an integrated system for interaction with a contact. The interaction is selectable from between human and computer delivery. The user may execute an interaction protocol to create an interaction with the contact. The call may then be initiated by the user or computer, for example by means of a dialing system, and the user may selectively interleave responses from a human agent and a recorded script.

The recorded script may include recorded data effective to control a computer for generating a human-sounding voice waveform. The recorded script is selected from computer-generated wave files, audio recordings, and synthesized voice. The recorded script may also a voice waveform created independently from the human agent. The voice waveform may also be an audio track of a voice response recorded by a voice actor.

Executing an interaction series or protocol 230 may include logging on by an agent. Executing an interaction series or protocol 230 may also include selecting a contact type. This may done according to available demographic data or referral data. The method may also include validating sales information. This may or may not be included as part of executing an interaction series 230. Validating may be done by human agent or a computer dialing system. The method may also includes updating a customer file based sales decisions or information gathered during the phone call.

A history of recorded and played scripts may be kept in the computers memory 18. This history may be recalled for a variety of reasons, including to verify what the user or agent claims was said to the contact or to contradict what a contact claims he or she was told by the agent. The history of the scripts played is quite similar to a recording of the entire conversation, given that particular scripts are linked to a finite range of answers given by the contact. Thus, a user of the system, in many instances, can recall both sides of a conversation between the agent and the contact.

The step of interleaving responses to the contact from either the agent or the computer includes listening by the human agent to a response from the contact 234. Based on what is said or not said, the agent may select and present content to the contact 234. Presenting content may be by posing a question to the contact which corresponds to a particular answer given by the agent. The answer may have been anticipated and displayed on the agent's computer screen. By clicking on the answer displayed on the screen, the computer launches the playing of the next script, which is a logical progression of the conversation or presentation of prior scripts.

At any time, the agent may decide to intervene 236 in the logical progression of the branching script. The agent may decide to play interjection script that is conversational in nature. For example, if the contact does not give a clear response, then the agent may not be able click on one of a predetermined number of answers associated with the scripted question asked. In this case, the agent may decide to intervene in the logical presentation of scripted questions and answers and play an interjection script 242 such as "I'm sorry, could you repeat that." Once a clear answer is given, the agent may again go back to the script tree by clicking on the answer given by the contact which will launch the playing of the next script in the progression. The agent may also decide to intervene 236 with a live voice response 240.

At any time during the playing of scripts or the presentation of live voice input, the agent may selectively decide to end the call 244. This may be accomplished by playing an ending script such as, "How many videos would you like to order," or "I'm sorry your not interested, but have a nice evening." The agent may also decide to end the call with live voice. The program is then ended.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

From the above discussion, it will be appreciated that the present invention provides a client-initiated program and method of using same for providing outgoing calls. The invention may provide human voice or pre-recorded scripts that are flexible in the way content is presented and easily negotiable. The present invention also provides a program that allows for live validation of sale information (i.e. credit card information, etc.) and allows the operator to maintain and update a customer profile. The system and method of the present invention also allows the program to keep an historical record of which pre-recorded tracks were played by the sales agent and in what order. Thus, customer-alleged promises statements by the sales agent can be verified or denied with a tangible record. The system of the present invention provides for the seamless and transparent integration of an agent's live voice with a prerecorded voice by someone other than the agent.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for customer contacting, the method comprising:
   providing a system for interaction with a contact, the interaction being selectable between human and computer delivery;
   executing an interaction protocol to create an interaction with the contact;
   initiating a call to the contact; and
   allowing an agent to selectively interleave recorded scripts during the call, the recorded scripts comprising recorded scripted responses and recorded interjection responses, and wherein the recorded scripted responses are selected from a script menu by the agent and wherein the recorded interjection responses are selected from an interjection menu by the agent.

2. The method of claim 1, wherein the executing an interaction protocol is done by one of a human agent and a computer script.

3. The method of claim 1, wherein the recorded script further comprises recorded data for generating a human-sounding voice waveform.

4. The method of claim 1, wherein the recorded script is selected from computer-generated wave files, audio recordings, and synthesized voice.

5. The method of claim 1, wherein the recorded script comprises a voice waveform created independently from the human agent.

6. The method of claim 5, wherein the voice waveform further comprises an audio track of a voice response recorded by a voice actor.

7. The method of claim 1, wherein executing an interaction protocol further comprises selecting a contact type.

8. The method of claim 1, further comprising validating sales information.

9. The method of claim 8, wherein validating sales information is done by one of a human agent and a computer dialing system.

10. The method of claim 1, further comprising updating a customer file.

11. The method of claim 1, further comprising maintaining a history of recorded scripts played.

12. The method of claim 1, wherein initiating a call is executed by one of a human agent and a computer dialing system.

13. The method of claim 1, wherein interleaving further comprises listening by the human agent to a response from the contact.

14. The method of claim 1, wherein interleaving further comprises selecting and presenting content to the contact.

15. The method of claim 14, wherein interleaving further comprises posing a question following presenting content.

16. The method of claim 1, wherein interleaving further comprises deciding on intervention.

17. The method of claim 16, wherein deciding on intervention is done by the human agent.

18. The method of claim 16, wherein deciding on intervention further comprises determining to provide a live-voice response.

19. The method of claim 16, wherein deciding on intervention further comprises determining to provide a recorded response.

20. A computer readable medium used to direct a computer to function in a specified manner, comprising: computer executable instructions stored in said computer readable medium, said executable instructions comprising instructions for performing a method for contacting a customer, the method comprising:
   providing an integrated system for hybridized interaction with a contact, the interaction being selectable between human and computer delivery;
   initiating a call to the contact;
   executing an interaction protocol to create an interaction with the contact; and
   allowing a human agent to selectively interleave recorded scripts during the call, the recorded scripts comprising recorded scripted responses and recorded interjection responses, and wherein the recorded scripted responses are selected from a script menu by the agent and wherein the recorded interjection responses are selected from an interjection menu by the agent.

21. The computer readable medium of claim 20, wherein the initiating step is executed by one of a human agent and a computer dialing system.

22. The computer readable medium of claim 20, wherein the executing step is done by one of a human agent and a computer script.

23. The computer readable medium of claim 20, wherein the recorded script further comprises recorded data effective to control a computer for generating a human-sounding voice waveform.

24. The computer readable medium of claim 20, wherein the recorded scripted response is selected from computer-generated wave files, audio recordings, and synthesized voice.

25. The computer readable medium of claim 20, wherein at least one of the recorded scripted response and the recorded interjection response comprises an audio track of a voice response recorded by a voice actor.

26. The computer readable medium of claim 20, wherein executing an interaction protocol further comprises logging on by an agent.

27. The computer readable medium of claim 20, wherein executing an interaction protocol further comprises selecting a contact type.

28. The computer readable medium of claim 20, wherein interleaving responses to the contact comprises posing a question to the contact, the question having a finite number of answers.

29. The computer readable medium of claim 28, wherein a preselected recorded script is associated with each of said finite number of answers.

30. The computer readable medium of claim 29, wherein selectively interleaving further comprises presenting the preselected recorded script associated with said finite number of answers.

31. The computer readable medium of claim 20, wherein executing an interaction protocol further comprises validating sales information.

32. The computer readable medium of claim 31, wherein validating sales information is done by one of a human agent and a computer dialing system.

33. The computer readable medium of claim 20, wherein executing an interaction protocol further comprises updating a customer file.

34. The computer readable medium of claim 20, wherein executing an interaction protocol further comprises maintaining a history of recorded scripts played.

35. The computer readable medium of claim 20, wherein executing an interaction protocol further comprises deciding on intervention.

36. The computer readable medium of claim 35, wherein deciding on intervention is done by the human agent.

37. The computer readable medium of claim 36, wherein deciding on intervention further comprises selecting between options including at least a live-voice response and a recorded response.

38. A method for customer contacting, the method comprising:
   providing a system for interaction with a contact, the interaction being selectable between human and computer delivery;
   initiating a call to the contact; and
   allowing a human agent to selectively interleave responses to the contact during the call, said responses comprising a recorded scripted response and a recorded interjection response, and wherein the recorded scripted response is selected from a script tree by the agent and wherein the recorded interjection response is selected from an interjection menu by the agent.

39. The method of claim 38, wherein interleaving responses to the contact comprises posing a question to the contact, the question having a finite number of answers.

40. The method of claim 39, wherein a preselected recorded script is associated with each of said finite number of answers.

41. The method of claim 40, wherein selectively interleaving further comprises presenting the preselected recorded script associated with the finite number of answers.

42. The method of claim 38, wherein the predetermined answers are selected from computer-generated wave files, audio recordings, and synthesized voice.

43. The method of claim 42, wherein at least one audio recording comprises a voice response recorded by a voice actor.

44. The method of claim 38, further comprising validating sales information.

45. The method of claim 38, further comprising updating a customer file.

46. The method of claim 38, further comprising maintaining a history of recorded scripts played.

47. The method of claim 38, wherein interleaving further comprises deciding on intervention.

48. The method of claim 47, wherein deciding on intervention further comprises selecting between options including at least a live-voice response and a recorded response.

* * * * *